(12) United States Patent
Fosbinder et al.

(10) Patent No.: US 7,265,319 B2
(45) Date of Patent: Sep. 4, 2007

(54) MULTIFUNCTION METER FOR WELDING APPARATUS

(75) Inventors: Daniel C. Fosbinder, Appleton, WI (US); John C. Leisner, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 360 days.

(21) Appl. No.: 10/709,830

(22) Filed: Jun. 1, 2004

(65) Prior Publication Data

US 2005/0263511 A1 Dec. 1, 2005

(51) Int. Cl.
*B23K 9/095* (2006.01)
(52) U.S. Cl. .................... 219/133; 219/130.01
(58) Field of Classification Search ........... 219/130.01, 219/133; 290/1 A, 40 C, 51; 73/117.2, 73/117.3
See application file for complete search history.

(56) References Cited

U.S. PATENT DOCUMENTS

| | | | | |
|---|---|---|---|---|
| 4,322,630 A | * | 3/1982 | Mezera et al. ............ 290/40 C |
| 4,465,920 A | * | 8/1984 | Hoyt et al. .................. 219/133 |
| 4,798,082 A | * | 1/1989 | Fujikawa et al. ........... 73/117.3 |
| 5,453,939 A | * | 9/1995 | Hoffman et al. ............ 73/117.2 |
| 5,630,954 A | | 5/1997 | Toth |
| 6,172,428 B1 | * | 1/2001 | Jordan ....................... 290/40 C |
| 2003/0042237 A1 | * | 3/2003 | Brofft et al. ................. 219/133 |
| 2004/0155466 A1 | * | 8/2004 | Sodemann et al. ......... 290/1 A |
| 2005/0155959 A1 | * | 7/2005 | Bender et al. ............... 219/133 |

* cited by examiner

Primary Examiner—Clifford C. Shaw
(74) Attorney, Agent, or Firm—Ziolkowski Patent Solutions Group, SC

(57) ABSTRACT

A multifunction meter and method for monitoring a welding-type device is disclosed. The multifunction meter has a single display unit, a first input configured to receive feedback from an engine, and a second input configured to receive feedback from a power converter. The engine is configured to deliver power to the power converter which is configured to deliver a welding-type power to a welding-type apparatus. A processing unit is connected to the single display unit, the first input, and the second input, and processes the feedback from the engine and the feedback from the power converter and displays data indicative of engine operation and power output of the power converter on the single display unit.

24 Claims, 3 Drawing Sheets

MULTIFUNCTION METER FOR WELDING APPARATUS

BACKGROUND OF INVENTION

The present invention relates generally to engine driven welding systems and, more particularly, to a multifunction meter for use therewith.

Engine driven welding systems generally include an internal combustion engine that generates power used to power the welding-type apparatus. An operator of such devices, in order to effectuate a desired welding process, can control and monitor the power signal required for a desired welding process. The control of the power signal often includes a plurality of switches or dials that an operator can manipulate in order to generate the desired welding signal. During a welding process, the power signal may differ slightly from the selected signal. This deviation of the welding power signal may adversely affect the welding process and detrimentally affect weld quality.

In addition to monitoring the weld power signal, it is also desirable to monitor engine operation. Typically, engines used to power welding-type devices are subject to periodic maintenance. The periodic maintenance of the engine includes maintaining engine oil integrity, coolant levels, and other common maintenance protocols. The engine maintenance protocols are often dictated by the operating conditions of the engine, hours of operation, and engine load criteria. That is, an engine that is operated more often under heavy load or at increased RPM's may require a shorter interval between scheduled maintenance than an engine that is operated under less demanding conditions. In order to ensure extended and reliable operation of the engine, an operator must know the operating history of the particular device. In environments where the device is often operated by several different operators, this creates situations where device engine maintenance may be inadvertently overlooked.

It would therefore be desirable to have a system and method capable of indicating to an operator the operating values of the welding power signal as well as engine operating parameters and maintenance information.

BRIEF DESCRIPTION OF INVENTION

The present invention provides a system and method of monitoring a welding-type apparatus that solves the aforementioned problems. The present invention provides a multifunction meter that displays both data indicative of the welding power signal and data indicative of engine operation and maintenance.

Therefore, in accordance with one aspect of the present invention, a multifunction meter is disclosed that has a single display unit, a first input, a second input, and a processing unit. The first input is configured to receive feedback from an engine configured to deliver power to a power converter. The second input is configured to receive feedback from the power converter that is configured to deliver welding-type power to a welding-type apparatus. The processing unit is connected to the single display unit, the first input, and the second input, and is configured to process the feedback from the engine and the feedback from the power converter and display data indicative of engine operation and power output of the power converter on the single display unit.

According to another aspect of the present invention, a welding-type apparatus is disclosed. The welding-type apparatus has a mechanical to electrical power converter connected to an engine and is configured to generate a power signal suitable for welding processes. A multifunction meter is configured to alternately display engine condition data and power signal data.

According to a further aspect of the present invention, a method of monitoring a welding-type device is disclosed including the steps of; receiving at least two sets of data indicative of a welding-power signal, receiving data indicative of an engine condition; and displaying the data indicative of a welding-power signal and the data indicative of an engine condition on a single set of meters.

In accordance with another aspect of the present invention, a welding-type apparatus is disclosed that includes an engine configured to provide mechanical power to a power source. The power source is configured to generate electrical power suitable for welding processes. The welding-type apparatus has a single set of meters to display volts and amps of the electrical power and means for on demand displaying of engine condition data on the single set of meters.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
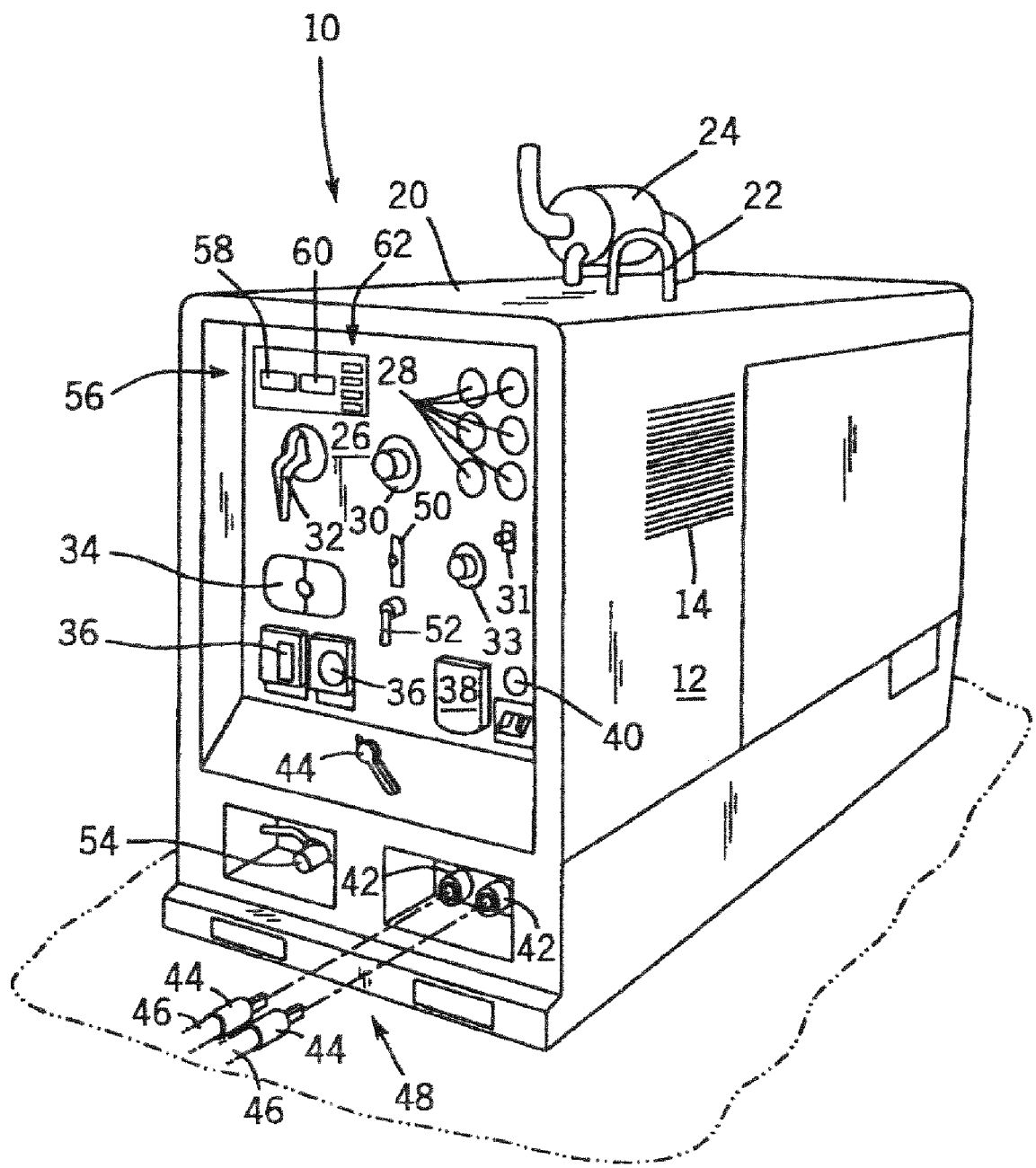
FIG. 1 is a perspective view of the welding-type apparatus according to the present invention.

Referring now to FIG. 1, a portable engine-driven welder system 10 is provided and, for brevity, will hereinafter be referred to as a welding device 10. As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, aircraft ground power units, and the like. Reference to welding power, welding-type power, or welders generally, includes welding, cutting, heating power, or ground power for aircraft. Description of a welding apparatus illustrates just one embodiment in which the present invention may be implemented. The present invention is equivalently applicable with many high power systems, such as cutting and induction heating systems, aircraft ground power systems or any similar systems.

The welding device 10 has an outer housing 12 that has one or more air vents 14 for cooling internal components of welding device 10. The housing 12 can be easily removed to permit access to the internal components for maintenance and service. An upper surface 20 of welding device 10 includes a lifting hook 22 extending therethrough for lifting and transporting of the welding device. Also attached to the upper surface 20 is an exhaust system 24 that lowers noise and passes exhaust gas from an engine of welding device 10 through housing 12. Welding device 10 is shown as being engine driven for exemplary purposes. It is understood that welding device 10 could be powered by an external power source such as a power grid.

Welding device 10 includes a control panel 26 that has various control elements and gauges for operating the welding device 10. A plurality of gauges 28 measure various parameters of the welding device 10. Measured parameters can include fuel level, oil temperature, battery amperage, and air pressure. Control panel 26 also has a control dial 30 and an ampere range switch 32 which are used to select a voltage/amperage for welding operations. Process selector switch 34 selects the type of weld output. The weld output is determined by the type of welding process. Examples of weld processes that may be implemented include stick welding, gas metal arc welding, tungsten inert gas welding, air-carbon arc cutting, and the like. Electrical outlets 36 provide power for electrically driven devices, such as saws, drills, etc. Control panel 26 also includes a compressor on/off switch 31 and an engine control switch 33 to independently control the compressor and engine, respectively.

The control panel 26 also includes multiple power connections such as a single phase power connect 38, an optional three-phase power connect 40, and weld-power receptacles 42. Weld cable connectors 44 are connected to welding cables 46 and are constructed to engage weld-power receptacles 42. Weld cables 46 electrically connect a torch and a work clamp to welding device 10. Weld-power receptacles 42 and weld cable connectors 44 form a connector assembly 48 for removably connecting weld cables 46 to welding device 10. An optional polarity switch 50 can be used to select the polarity of the weld output. Typical selections include direct current electrode negative, direct current electrode positive, and alternating current. A panel remote switch 52 and remote receptacle 54 select remote control of the welding device 10 in instances where welding operations are remotely located from the welding device 10.

Figure 2:
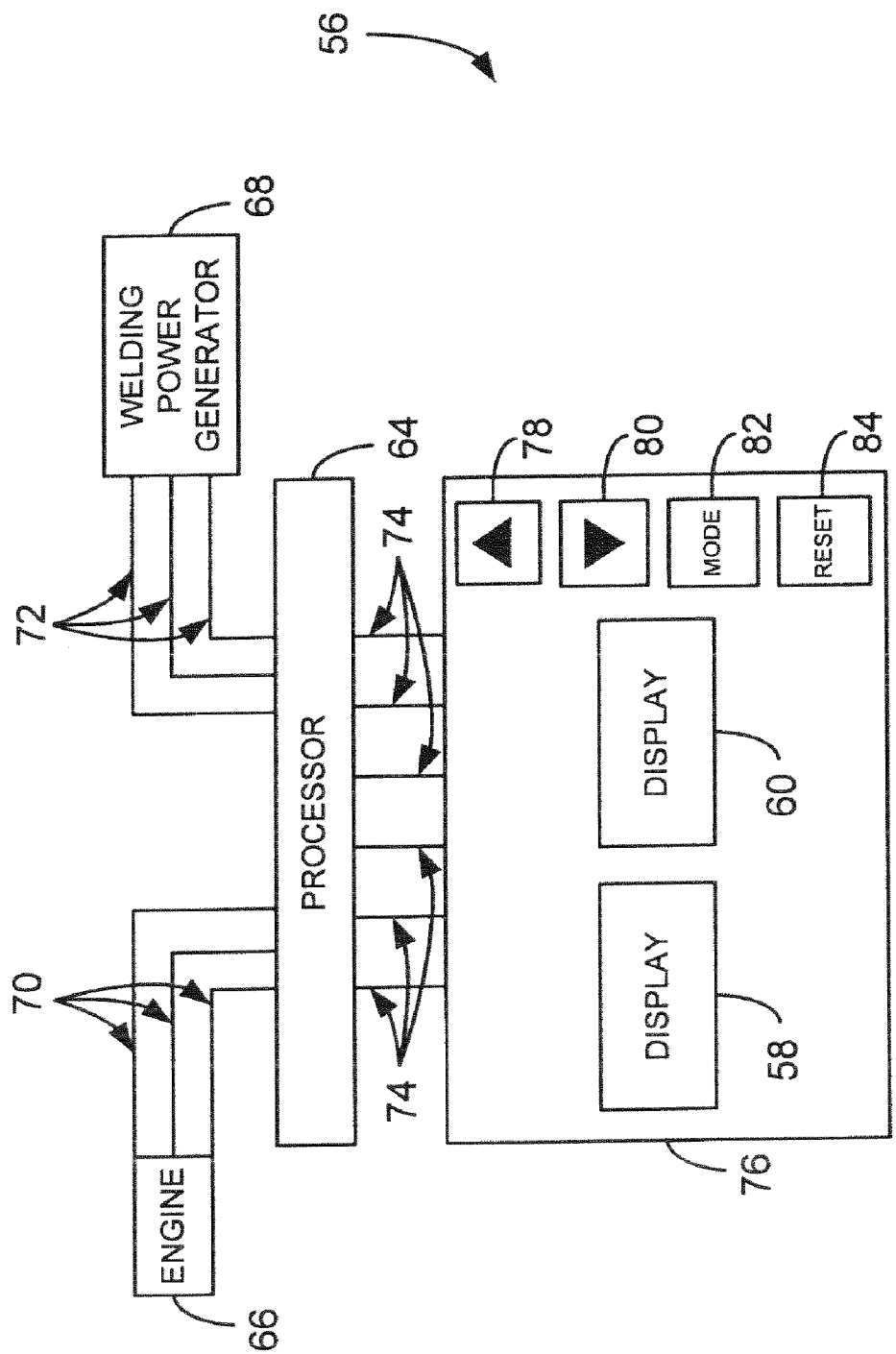
FIG. 2 is a block diagram of the major components of the welding-type apparatus of FIG. 1.

A multifunction meter 56 is positioned on control panel 26. Multifunction meter 56 includes a pair of displays 58, 60 and a plurality of meter controls 62. As shown in FIG. 2, multifunction meter 56 includes a processor 64 connected to an engine 66 of welding device 10. Processor 64 is also connected to a welding power generator 68. Welding power generator 68 is also mechanically attached to engine 66 and configured to generate an electrical power signal suitable for welding from the mechanical power output of engine 66. A plurality of inputs 70 extend from engine 66 to processor 64 and communicate engine parameters to processor 64 of multifunction meter 56. A second set of inputs 72 extend from weld power generator 68 to processor 64 and communicate feedback from the weld power generator to the processor of multifunction meter 56. Processor 64 includes a plurality of outputs 74 which connect processor 64 to a control module 76 of multifunction meter 56.

During a welding operation, display 58 indicates the voltage of a welding power signal. Similarly, display 60 displays a current of the weld power signal generated by welding device 10. Displays 58, 60 are configured to alternately display engine operating parameters such as RPM, engine temperature, and oil pressure. Optionally, processor 64 is configured to receive inputs from the plurality of meter controls 62. Meter controls 62 include a plurality of push buttons or touch-sensitive inputs 78, 80, 82, and 84 which allow an operator to select which set of parameters are indicated on displays 58, 60. Buttons 78, 80 allow an operator to toggle through data and parameters received from processor 64 at any point of operation. Similarly, buttons 82, 84 allow an operator to input and manipulate data contained in processor 64, as well as change the data displayed at displays 58 and 60. As such, when processor 64 is set to a default of displaying welding parameters such as voltage and amperage, an operator may override such signals and display desired data at displays 58 and 60. Also, if any particular parameter of the engine or welding power generator were out of specification, such as low oil pressure, the processor 64 would interrupt the displays to display the out of specification parameter. Such "emergency" display would preferably be either blinking or be a brighter output to draw the attention of the operator.

In addition to displaying engine condition data and weld power signal data, multifunction meter 56 is also configured to display other device data such as date of manufacture, purchaser information, software identification data, device identification data, auxiliary outlet data, unit maintenance data, or device error data. A specific series of inputs from buttons 78, 80, 82, and 84 would invoke the processor 64 to cause display of such data. These outputs are merely exemplary and in no way limit the scope of the claims. Preferably multifunction meter 56 is configured to output any data which may be useful at any point during the operating life of the device. While buttons 78, 80, 82, and 84 allow an operator to toggle through the data and operating parameters displayable on multifunction meter 56, device 10 can be configured to allow an operator to select which data is displayed determined by a protocol of inputs communicated to the processor through the ignition switch or other selector switches located on the control panel. That is, processor 64 could be configured to display a selected data, such as hours of engine operation, by a predefined sequence of ignition switch positioning.

Figure 3:
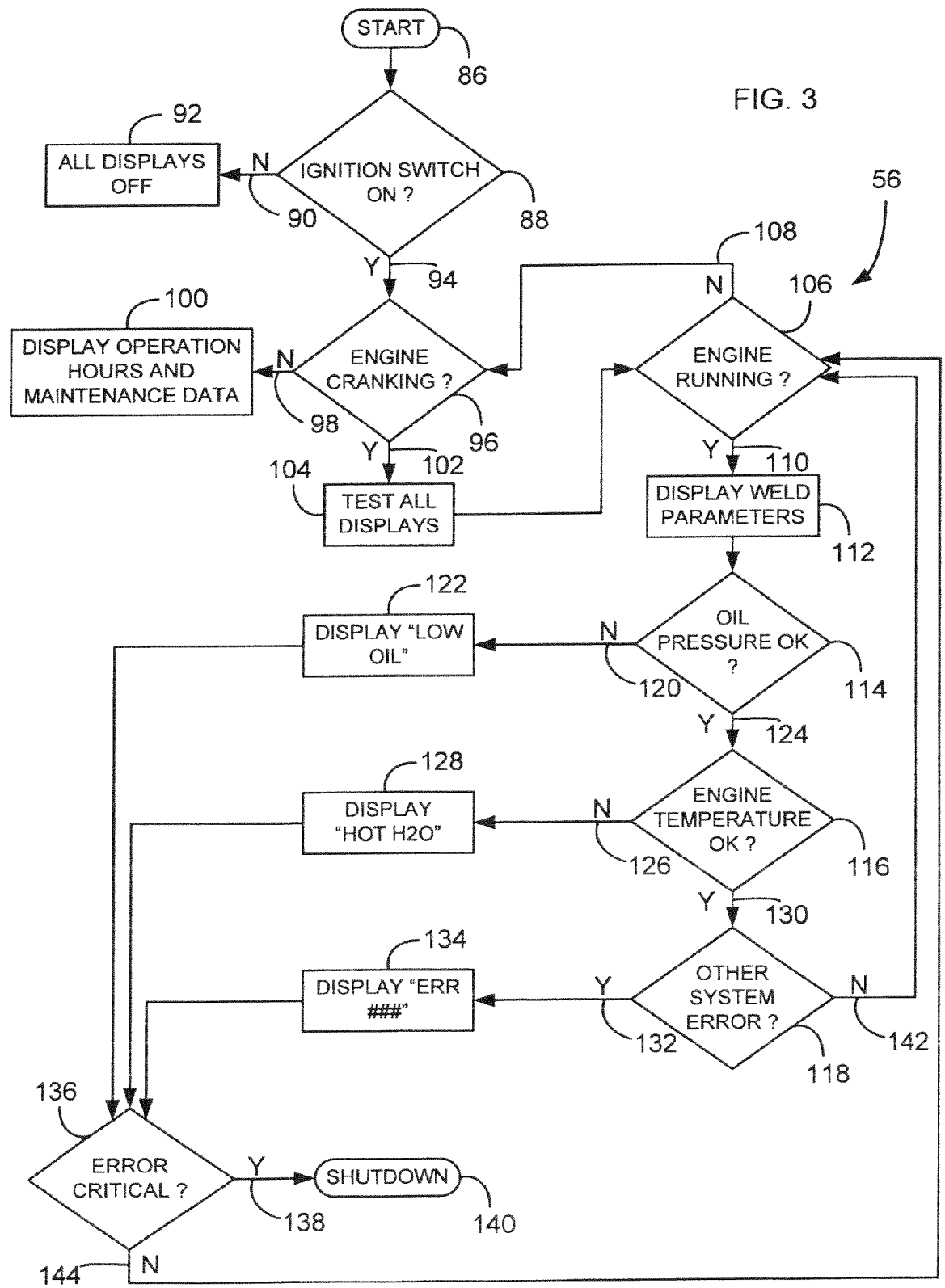
FIG. 3 is a block diagram of operation of the multifunction meter of Figure.

Referring to FIG. 3, control and output of multifunction display 56 initiates at unit power-up 86 with a check of ignition switch position 88. If the ignition switch is OFF 90, displays 58, 60 are also disabled 92. If the ignition switch is ON 94, but the engine is not cranking 96, 98, displays 58 and 60 display operation hours and maintenance data 100. If the engine is cranking 102, all displays are tested 104. After testing all displays, processor 64 checks whether the engine is running or not 106. If the engine is not running 106, 108, processor 64 returns to check if the engine is still cranking 96. On the other hand, if the engine is running 106, 110, processor 64 displays weld parameters 112 as preset on control panel 26 as shown in FIG. 1. While engine 66 is running 110, processor 64 continually checks oil pressure 114, engine temperature 116, and other system errors 118. If the system oil pressure is below a preset threshold 114, 120, a "LOW OIL" warning 122 is displayed on displays 58, 60 to inform an operator of the oil pressure condition. If the oil pressure is within a threshold operating range 124, processor 64 verifies engine temperature at 116. If the engine temperature is beyond a preferred operating range 126, a "HOT H2O" warning 128 is displayed on displays 58, 60. If the engine operating temperature is within a predetermined range 116, 130, processor 64 checks for other system errors 118, such as restricted air flow, low charge rate, or excessive or undesirable weld system power source signals. If there is such an error 132, displays 58 and 60 display an error code 134 which can be related to specific system components and system parameters. In the event that there is a low oil pressure condition 122, excessive engine temperature condition 128, or other system error 134, processor 64 validates whether such error is a critical error based on predetermined/preset values 136.

If any of the "LOW OIL" 122, "HOT H2O" 128, or error codes 134 are beyond a critical operating range 136, 138, processor 64 automatically shuts down 140 welding device 10. In the event that the engine oil pressure is within a predetermined range 114, 124, engine temperature is acceptable 116, 130, and no system error 118 has occurred, processor 64 returns 142 to verify engine running 106 and then continually checks the operating parameters. Likewise, in the event that there is a low oil condition 122, hot engine cooling water condition 128, or other system error code 134, and the error is not a critical error 136, as determined by the preset values, processor 64 returns 144 to check engine operating conditions 106, display weld parameters 112, and check system conditions 114, 116, 118. As such, during welding operations, multifunction meter 56 displays weld parameters unless an engine or system error has occurred. Such a system allows an operator of such a device to readily maintain and be informed of the engine and welding power source supply conditions and parameters as well as readily identify engine maintenance and unit identity data.

Therefore, the present invention includes a multifunction meter that has a single display unit, a first input, a second input, and a processing unit. The first input is configured to receive feedback from an engine configured to deliver power to a power converter. The second input is configured to receive feedback from the power converter that is configured to deliver a welding-type power to a welding-type apparatus. The processing unit is connected to the single display unit, the first input, and the second input, and is configured to process the feedback from the engine and the feedback from the power converter and display data indicative of engine operation and power output of the power converter on the single display unit.

Another embodiment of the present invention includes a welding-type apparatus having a mechanical to electrical power converter connected to an engine. The power converter is configured to generate a power signal suitable for welding processes. A multifunction meter is configured to alternately display engine condition data and power signal data.

An alternate embodiment of the present invention includes a method of monitoring a welding-type device. The method includes the steps of: receiving at least two sets of data indicative of a welding-power signal, receiving data indicative of an engine condition; and displaying the data indicative of a welding-power signal and the data indicative of an engine condition on a single set of meters.

A further embodiment of the present invention has a welding-type apparatus that includes an engine configured to provide mechanical power to a power source. The power source is configured to generate electrical power suitable for welding processes. The welding-type apparatus has a single set of meters to display volts and amps of the electrical power and means for on demand displaying of engine condition data on the single set of meters.

The present invention has been described in terms of the preferred embodiment, and it is recognized that equivalents, alternatives, and modifications, aside from those expressly stated, are possible and within the scope of the appending claims.

What is claimed is:

1. A multifunction meter comprising:
   a display unit having a plurality of individual displays thereon;
   a first input configured to receive feedback from an engine configured to deliver power to a power converter;
   a second input configured to receive feedback from the power converter, the power converter configured to deliver a welding-type power to a welding-type apparatus;
   a processing unit connected to the display unit, the first input, and the second input, and configured to process the feedback from the engine and the feedback from the power converter and digitally display data indicative of engine operation and power output of the power converter on the display unit; and
   wherein each of the individual displays is configured to display at least the data indicative of engine operation and the data indicative of power output of the power converter.

2. The multifunction meter of claim 1 further comprising at least one mode of selection button connected to the processing unit to regulate the display of data.

3. The multifunction meter of claim 1 wherein the multifunction meter is electrically connected to an engine ignition switch.

4. The multifunction meter of claim 1 wherein the data displayed includes at least one of voltage and current of the welding-type power.

5. The multifunction meter of claim 1 wherein the data displayed includes at least one of an hour meter, engine temperature, engine oil level, and engine RPM.

6. The multifunction meter of claim 1 wherein the processing unit is further configured to store at least one of a unit serial number, a software revision number, and a date of manufacture.

7. The multifunction meter of claim 1 wherein the processing unit is further configured to determine if the feedback from the engine and the power converter is outside of a pre-determined threshold range and, if the feedback is outside of the pre-determined threshold range, interrupt the displaying of the data indicative of engine operation and the data indicative of power output of the power converter to display an error code.

8. The multifunction meter of claim 1 wherein the processing unit is further configured to display an hours of operation data and maintenance data.

9. The multifunction meter of claim 8 wherein the hours of operation data is resetable.

10. The multifunction meter of claim 1 wherein the display data is accessible independent of an engine running condition.

11. The multifunction meter of claim 1 wherein the processing unit is further configured to display data of at least one accessory receptacle.

12. A welding-type apparatus comprising:
   an engine;
   a mechanical to electrical power converter connected to the engine and configured to generate a power signal suitable for welding processes;
   a control panel configured to operate the engine and mechanical to electrical power converter;
   a multifunction meter imposed on the control panel and configured to display engine condition data and power signal data; and
   wherein the multifunction meter further comprises meter controls configured to toggle the displaying of the engine condition data and the power signal data.

13. The welding-type apparatus of claim 12 wherein the power signal data includes at least one of voltage and current.

14. The welding-type apparatus of claim 12 wherein the engine condition data includes at least one of hours of operation, RPM, temperature, and oil level.

15. The welding-type apparatus of claim 12 wherein the multifunction meter includes a plurality of digital displays to concurrently display the engine condition data and the power signal data.

16. The welding-type apparatus of claim 12 wherein the multifunction meter further comprises at least one menu selection button.

17. The welding-type apparatus of claim 12 wherein the multifunction meter is further configured to display an auxiliary receptacle condition.

18. The welding-type apparatus of claim 12 wherein the multifunction meter is further configured to display at least one of a user identity data, a software version data, a unit identity data, and an error code data.

19. A welding-type apparatus comprising:
a power source configured to generate electrical power suitable for welding processes;
an engine configured to provide mechanical power to the power source;
a single set of meters to display volts and amps of the electrical power; and
means for on demand displaying of engine condition data on the single set of meters.

20. The welding-type apparatus of claim 19 wherein the engine condition data includes at least one of hours of operation, RPM, oil level, and engine temperature.

21. The welding-type apparatus of claim 19 wherein the means for displaying on demand engine condition data further comprises means for selecting which data is displayed.

22. The welding-type apparatus of claim 19 further comprising a torch and workpiece cable electrically connectable to the power source.

23. The welding-type apparatus of claim 19 wherein the means for displaying on demand engine condition data further comprises means for displaying auxiliary outlet signal data.

24. The welding-type apparatus of claim 19 wherein the means for displaying on demand engine condition data further comprises means for displaying at least one of a unit identity data, a user identity data, a program identity data, and an error code data.

* * * * *